(12) United States Patent
Wakimoto et al.

(10) Patent No.: US 12,021,247 B2
(45) Date of Patent: Jun. 25, 2024

(54) RECTANGULAR ELECTRICITY STORAGE DEVICE

(71) Applicants: SANYO Electric Co., Ltd., Daito (JP); Panasonic Corporation, Kadoma (JP)

(72) Inventors: Ryoichi Wakimoto, Hyogo (JP); Kazutaka Mita, Hyogo (JP)

(73) Assignees: SANYO Electric Co., Ltd., Osaka (JP); PANASONIC HOLDINGS CORPORATION, Osaka (JP)

( * ) Notice: Subject to any disclaimer, the term of this patent is extended or adjusted under 35 U.S.C. 154(b) by 575 days.

(21) Appl. No.: 17/285,664

(22) PCT Filed: Oct. 10, 2019

(86) PCT No.: PCT/JP2019/040058
§ 371 (c)(1),
(2) Date: Apr. 15, 2021

(87) PCT Pub. No.: WO2020/090409
PCT Pub. Date: May 7, 2020

(65) Prior Publication Data
US 2021/0399366 A1    Dec. 23, 2021

(30) Foreign Application Priority Data

Oct. 29, 2018 (JP) ................................. 2018-203115

(51) Int. Cl.
*H01M 50/103* (2021.01)
*H01M 50/188* (2021.01)
(Continued)

(52) U.S. Cl.
CPC ....... *H01M 50/103* (2021.01); *H01M 50/188* (2021.01); *H01M 50/414* (2021.01);
(Continued)

(58) Field of Classification Search
None
See application file for complete search history.

(56) References Cited

U.S. PATENT DOCUMENTS

2011/0086265 A1* 4/2011 Suzuki ................. H01M 50/60
429/186
2012/0107681 A1    5/2012 Kogure
(Continued)

FOREIGN PATENT DOCUMENTS

CN    102067355 A    5/2011
JP    2005-294150 A    10/2005
(Continued)

OTHER PUBLICATIONS

English Translation of International Search Report dated Nov. 12, 2019, issued in counterpart Application No. PCT/JP2019/040058. (2 pages).
(Continued)

*Primary Examiner* — Wyatt P McConnell
(74) *Attorney, Agent, or Firm* — WHDA, LLP

(57) ABSTRACT

There is provided a prismatic power storage device having a reduced weight and ensuring a space for an electrode body that expands during charging, while the rigidity of an insulating sheet is ensured. A prismatic power storage device according to an aspect of the present disclosure includes: an electrode body (11) including a positive electrode plate, a negative electrode plate, and a separator disposed between the positive electrode plate and the negative electrode plate; an insulating holder (30) formed by shaping an insulating sheet (31) into a box shape and accommodating the electrode body (11); a prismatic outer case having an opening and accommodating the electrode body (11) and the insu-
(Continued)

lating holder (30); and a sealing body sealing the opening of the outer case. The insulating sheet (31) includes a porous body.

10 Claims, 4 Drawing Sheets

(51) Int. Cl.
*H01M 50/414* (2021.01)
*H01M 50/491* (2021.01)
*H01M 50/409* (2021.01)
*H01M 50/463* (2021.01)

(52) U.S. Cl.
CPC ........ *H01M 50/491* (2021.01); *H01M 50/409* (2021.01); *H01M 50/463* (2021.01)

(56) References Cited

U.S. PATENT DOCUMENTS

| | | |
|---|---|---|
| 2013/0130088 A1 | 5/2013 | Hashizaki |
| 2015/0349299 A1 | 12/2015 | Yamada et al. |
| 2016/0141565 A1 | 5/2016 | Uhm et al. |
| 2020/0362516 A1* | 11/2020 | Afshari ............... H01M 50/489 |

FOREIGN PATENT DOCUMENTS

| | | |
|---|---|---|
| JP | 2009-087812 A | 4/2009 |
| JP | 2009-170137 A | 7/2009 |
| JP | 2012-079466 A | 4/2012 |
| JP | 2012-099252 A | 5/2012 |
| JP | 2015-204194 A | 11/2015 |
| JP | 2015-225839 A | 12/2015 |
| JP | 2016-522546 A | 7/2016 |
| JP | 2017-076476 A | 4/2017 |
| JP | 2018-181703 A | 11/2018 |
| KR | 10-2016-0048324 A | 5/2016 |
| WO | 2009/150912 A1 | 12/2009 |
| WO | 2012/029948 A1 | 3/2012 |

OTHER PUBLICATIONS

English Translation of Chinese Search Report dated Dec. 5, 2023 issued in counterpart Chinese Patent Application No. 201980070997.9. (2 pages).

* cited by examiner

RECTANGULAR ELECTRICITY STORAGE DEVICE

TECHNICAL FIELD

The present disclosure relates to a prismatic power storage device.

BACKGROUND ART

In recent years, the use of a power storage device such as a secondary battery or a capacitor as a power supply for driving a vehicle such as an electric vehicle (EV) or a hybrid electric vehicle (HEV) has received attention. Such a power storage device sometimes has, as an outer case, a metal case made of, for example, aluminum in view of mechanical strength. When the metal case and an electrode body accommodated in the metal case come into contact with one another, a short circuit between a positive electrode and a negative electrode in the electrode body may occur.

To prevent such a short circuit from occurring, for example, PTL 1 proposes that an electrode body be accommodated in an insulating holder formed by an insulating sheet being bent into a box shape, the electrode body be accommodated in an outer case with the insulating holder, and the insulating holder thereby be interposed between the electrode body and the outer case to ensure contact (insulation) between the electrode body and the outer case.

CITATION LIST

Patent Literatures

PTL 1: Japanese Published Unexamined Patent Application No. 2009-170137
PTL 2: Japanese Published Unexamined Patent Application (Translation of PCT Application) No. 2016-522546
PTL 3: Japanese Published Unexamined Patent Application No. 2017-76476

SUMMARY OF INVENTION

Technical Problem

It has been desired to reduce the thickness of an insulating sheet constituting an insulating holder to reduce the weight of a power storage device and ensure a space for an electrode body that expands during charging. However, when the thickness of the insulating sheet is reduced, the rigidity decreases, the formability of the box-shaped insulating holder decreases, and the box-shaped insulating holder thereby comes to have a distorted shape. As a result, when, for example, the insulating holder is placed in the outer case with the electrode body, the battery performance may be decreased by pressure beyond assumptions being applied to the electrode body due to the insulating holder wrinkling, or insulation between the electrode body and the outer case may fail to be ensured due to the insulating sheet curling.

Accordingly, the present disclosure aims to provide a prismatic power storage device having a reduced weight and ensuring a space for an electrode body that expands during charging, while the rigidity of an insulating sheet is ensured.

Solution to Problem

A prismatic power storage device according to an aspect of the present disclosure includes: an electrode body including a positive electrode plate, a negative electrode plate, and a separator disposed between the positive electrode plate and the negative electrode plate; an insulating holder formed by shaping an insulating sheet into a box shape and accommodating the electrode body; a prismatic outer case having an opening and accommodating the electrode body and the insulating holder; and a sealing body sealing the opening of the outer case. The insulating sheet includes a porous body.

Advantageous Effects of Invention

According to the aspect of the present disclosure, the prismatic power storage device having a reduced weight and ensuring a space for the electrode body that expands during charging, while the rigidity of the insulating sheet is ensured, can be provided.

DESCRIPTION OF EMBODIMENTS

Figure 1:
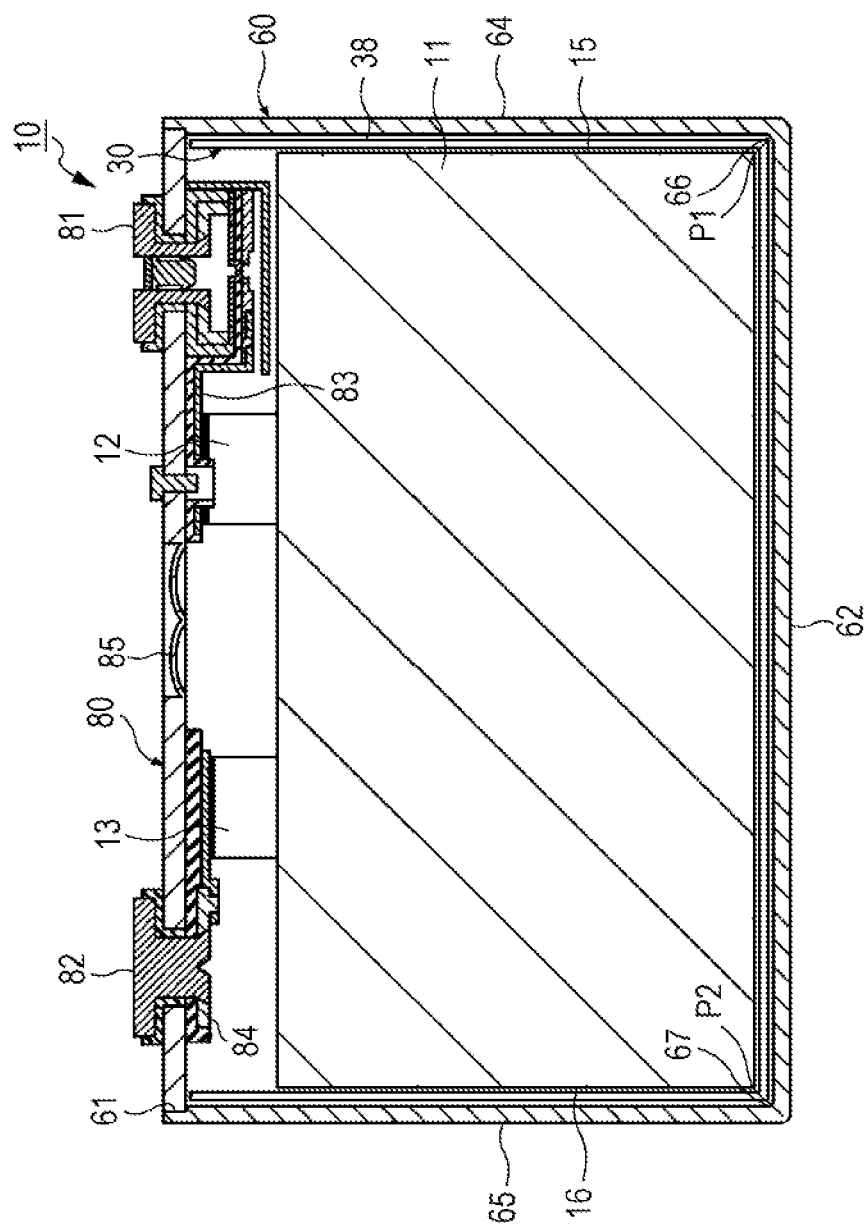
FIG. 1 is a sectional view of a prismatic power storage device according to an example of an embodiment.

Hereinafter, a prismatic power storage device according to an example of an embodiment will be described in detail. The drawings to be referred in the description of the embodiment are schematically illustrated, and, for example, the dimensional proportions of the constituents illustrated in the drawings may differ from those of the actual constituents. Specific dimensional proportions and the like should be determined in consideration of the following description. The term "substantially" in the description, in an example of the term: substantially identical, is intended to include not only perfectly identical but also virtually identical. The term "end portion" means an end of an object and a portion surrounding the end. Shapes, materials, the numbers of constituents and other particulars described below are examples for illustration and can be changed depending on the specifications of the power storage device. Hereinafter, the constituents similar to one another are denoted by the same references throughout the description.

The prismatic power storage device described below is used for, for example, a power supply for driving a vehicle such as an electric vehicle or a hybrid electric vehicle or a stationary power storage system for a peak-shift operation of grid-connected power.

Figure 2:
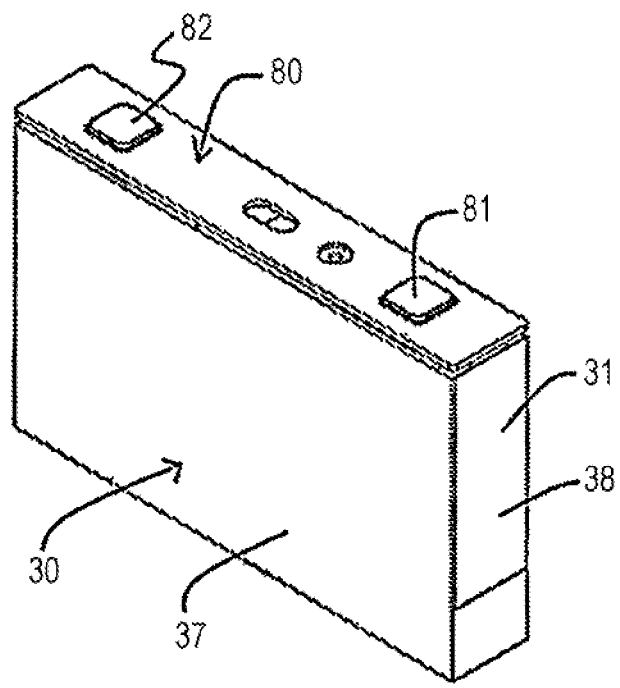
FIG. 2 is a perspective view of the prismatic power storage device illustrated in FIG. 1 when an outer case is removed therefrom.
Figure 3:
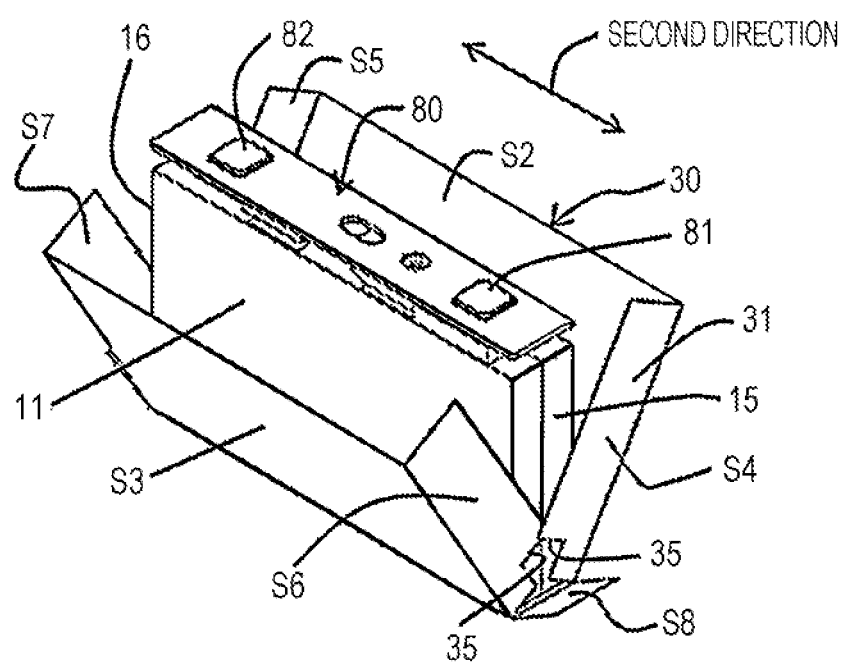
FIG. 3 is a perspective view illustrating a state in which an insulating holder in FIG. 2 is in the middle of assembly.

FIG. 1 is a sectional view of a prismatic power storage device 10 according to the example of the embodiment. FIG. 2 is a perspective view of the prismatic power storage device 10 illustrated in FIG. 1 when an outer case 60 is removed therefrom. FIG. 3 is a perspective view illustrating a state in which an insulating holder 30 in FIG. 2 is in the middle of assembly. In the following description, the sealing plate 80 side of the outer case 60 is referred to as the top and a side thereof facing away from the sealing plate 80 is referred to as the bottom for convenience of description.

The prismatic power storage device 10 illustrated in FIG. 1 is, for example, a non-aqueous electrolyte secondary battery such as a lithium ion secondary battery. As FIG. 1 illustrates, the prismatic power storage device 10 has an electrode body 11 as a power storage element, the insulating holder 30 accommodating the electrode body 11, the outer case 60, and the sealing plate 80. The insulating holder 30 has a box shape having a bottom portion and an opening at the upper end and accommodates the electrode body 11. The outer case 60 is a prismatic outer case having a bottom portion and an opening at the upper end and accommodates the electrode body 11 and the insulating holder 30 with an electrolytic solution (not illustrated) corresponding to a non-aqueous electrolyte. Note that the opening of the insulating holder 30 and such an opening 61 of the outer case 60 open in the same direction. The sealing plate 80 covers the opening 61 formed in the outer case 60. The sealing plate 80 has a positive terminal 81 and a negative terminal 82 that are away from one another in the longitudinal direction of the sealing plate 80 (the left-right direction of FIG. 1).

The electrode body 11 illustrated in FIG. 1 includes plural positive electrode plates, plural negative electrode plates, and separators and has a layered structure in which the positive electrode plates and the negative electrode plates are layered alternately with the separators interposed therebetween.

Each of the positive electrode plates, the negative electrode plates, and the separators is a substantially rectangular sheet, and the electrode body 11 constituted by the rectangular sheets being layered has end faces at both ends in the layering direction and side faces in four directions that are located between the end faces and surround the end faces.

The layered positive electrode plates, negative electrode plates, and separators may be bound with fixation tape or may be fixed to one another by applying adhesive to surfaces between the corresponding separator and the corresponding positive electrode plate or the corresponding positive electrode plate to bond the separator to the positive electrode plate or the negative electrode plate.

The electrode body 11 may be formed by replacing the rectangular cut-sheets of at least one kind of the positive electrode plates, the negative electrode plates, and the separators with a strip-shaped sheet and by folding the strip-shaped sheet in a zigzag manner.

Each of the positive electrode plates has, for example, a core body made of a material such as an aluminum foil, electrode layers formed on the front and back surfaces of the core body, a core body-exposed portion on which no electrode layer is formed, a positive electrode lead 12 that is a portion of the core body-exposed portion and is formed extending from an upper end of the core body-exposed portion.

The electrode layers of the positive electrode contain, for example, a positive electrode active material, a conductive agent, and a binding agent. Examples of the positive electrode active material include a lithium composite oxide such as a lithium nickel cobalt manganese composite oxide. Examples of the binding agent include a fluorocarbon resin such as polyvinylidene fluoride (PVdF). Examples of the conductive agent include a carbon material such as carbon black.

The positive electrode plate is produced as follows, for example. A slurry is prepared by adding an appropriate amount of a dispersion medium such as N-methyl pyrrolidone (NMP) to a mixture containing the positive electrode active material, the conductive agent, and the binding agent. The slurry is applied to both surfaces of the core body of the positive electrode, the dispersion medium in the slurry is removed by drying the applied slurry, and the electrode layers are formed on the core body. Subsequently, the electrode layers are compressed to a predetermined thickness. The positive electrode plate obtained in the above-described way is cut into a predetermined shape.

Each of the negative electrode plates has, for example, a core body made of a material such as a copper foil, electrode layers formed on the front and back surfaces of the core body, a core body-exposed portion on which no electrode layer is formed, a negative electrode lead 13 that is a portion of the core body-exposed portion and is formed extending from an upper end of the core body-exposed portion.

The electrode layers of the negative electrode contain, for example, a negative electrode active material, a conductive agent, a binding agent, and a thickener. Examples of the negative electrode active material include a carbon material such as graphite. Examples of the binding agent include styrene-butadiene rubber (SBR). Examples of the thickener include carboxymethyl cellulose (CMC).

The negative electrode plate is produced as follows, for example. A slurry is prepared by adding an appropriate amount of a dispersion medium such as water to a mixture containing the negative electrode active material, the conductive agent, the binding agent, and the thickener. The slurry is applied to both surfaces of the core body of the negative electrode, the dispersion medium in the slurry is removed by drying the applied slurry, and the electrode layers are formed on the core body. Subsequently, the electrode layers are compressed to a predetermined thickness. The negative electrode plate obtained in the above-described way is cut into a predetermined shape.

As the separator, a porous sheet having ion permeability and insulation properties is used, and examples thereof include a sheet of a resin made of a polyolefin such as polyethylene or polypropylene.

Regarding the positive electrode plates and the negative electrode plates facing one another with the separators interposed therebetween in the electrode body 11, when planarly viewed in the layering direction, each negative electrode plate is larger than each positive electrode plate with the exclusion of regions of the positive electrode lead 12 and the negative electrode lead 13, and the peripheral edge of the positive electrode plate is preferably located on the inner side of the peripheral edge of the negative electrode plate. Due to the configuration, it is possible to suppress lithium metal from being deposited on the negative electrode plate.

For example, the number of the provided positive electrode leads 12 and the number of the provided negative electrode leads 13 are respectively equal to the number of the positive electrode plates and the number of the negative electrode plates constituting the electrode body 11. Plural positive electrode leads 12 extending from an end face, on the opening side, of the insulating holder 30 in the electrode body 11 are bonded to a current collecting member 83 in a state of being bundled on the distal end side in the extending direction. The current collecting member 83 is electrically connected to the positive terminal 81 disposed in the sealing plate 80, and the positive electrode leads 12 are thereby electrically connected to the positive terminal 81 via the current collecting member 83. In addition, plural negative electrode leads 13 extending from the end face, on the opening side, of the insulating holder 30 in the electrode body 11 are bonded to a current collecting member 84 in a state of being bundled on the distal end side in the extending direction. The current collecting member 84 is electrically connected to the negative terminal 82 disposed in the sealing plate 80, and the negative electrode leads 13 are thereby electrically connected to the negative terminal 82 via the current collecting member 84. The positive electrode leads 12 and the negative electrode leads 13 are bonded to the respective current collecting member 83 and current collecting member 84 by ultrasonic welding, resistance welding, laser welding, cold welding, or other methods.

The current collecting member 83 of the positive electrode is constituted by, for example, an aluminum plate member. As described above, one end of the current collecting member 83 is connected to the positive electrode leads 12, and the other end thereof is connected to the positive terminal 81. Note that the positive terminal 81 and the current collecting member 83 may be electrically connected to one another via a current interrupting device. The current interrupting device is a safety device capable of interrupting the electrical connection between the current collecting member 83 and the positive terminal 81 when gas is generated inside the outer case 60 in an anomaly state of the prismatic power storage device 10 and if the pressure inside the outer case 60 exceeds a predetermined pressure. The current interrupting device includes, for example, a reversing plate connected to the other end of the current collecting member 83 and configured to deform in a direction away from the current collecting member 83 when receiving the pressure inside the outer case 60 and includes a conductive cap electrically connecting the reversing plate and the positive terminal 81 to one another. The conductive cap is a dish-shaped conductive member having an opening located on the lower side (the electrode body 11 side) and an upper face located on the upper side (the sealing plate 80 side). The upper face has a connection hole into which the positive terminal 81 is inserted.

The current collecting member 84 of the negative electrode is constituted by, for example, a copper plate member. As described above, one end of the current collecting member 84 is connected to the negative electrode leads 13, and the other end thereof is connected to the negative terminal 82. The current collecting member 84 may be fixed to the sealing plate 80 by, for example, the negative terminal 82.

Note that each of the current collecting members 83 and 84 may be constituted by a single member or by plural members connected to one another.

The positive terminal 81 is provided so as to pass through a terminal hole of the sealing plate 80 and has one end exposed to the outside of the outer case 60 and the other end accommodated in the outer case 60. The positive terminal 81 is fixed to the conductive cap by, for example, the other end being inserted in a connection hole formed in the upper face of the above-described conductive cap and by the other end of the positive terminal 81 being swaged so as to be widened radially. The positive terminal 81 is constituted by, for example, an aluminum tubular body.

The negative terminal 82 is provided so as to pass through a terminal hole of the sealing plate 80 and has one end exposed to the outside of the outer case 60 and the other end accommodated in the outer case 60. Regarding the negative terminal 82, for example, the other end connected to the current collecting member 84 inside the outer case 60 may be constituted by a copper material, and one end exposed to the outside of the outer case 60 may be constituted by an aluminum clad material. The negative terminal 82 is fixed to the sealing plate 80 with the current collecting member 84 by, for example, the other end of the negative terminal 82 being swaged so as to be widened radially.

The sealing plate 80 is constituted by, for example, processing an aluminum plate. The sealing plate 80 is located above the opening 61 of the outer case 60 and seals the opening 61 of the outer case 60 by being welded to the opening end of the outer case 60 by using, for example, a laser. The sealing plate 80 may have an injection hole for injecting the electrolytic solution into the outer case 60. The sealing plate 80 may have an injection plug for covering the injection hole. In addition, the sealing plate 80 may have a pressure regulating valve 85 that is formed by being surrounded by plural linear grooves and vents the gas inside the outer case 60 to the outside by the above-described grooves opening when the pressure inside the outer case 60 exceeds a predetermined pressure. The sealing plate 80 preferably has an annular groove in the peripheral edge. Due to the configuration, the peripheral edge of the sealing plate 80 can be efficiently melted when the sealing plate 80 and the outer case 60 are welded and bonded to one another.

Note that an insulating member may be interposed between the sealing plate 80 and the current collecting members 83 and 84. An insulating member may also be interposed between the respective terminal holes and the positive terminal 81 and the negative terminal 82 and between the upper surface of the sealing plate 80 and head portions of the positive terminal 81 and the negative terminal 82, which are exposed on the sealing plate 80.

The outer case 60 is, for example, a flat substantially box-shaped prismatic case having a bottom portion and an upper end having an opening. The outer case 60 is made of metal such as aluminum. The outer case 60 can be formed by, for example, drawing an aluminum material. The outer case 60 has a bottom plate portion 62 and plural side walls arranged vertically on the peripheral edge of the bottom plate portion 62, and the opening 61 is formed at the end facing away from the bottom plate portion 62. The plural side walls of the outer case 60 are constituted by two short side walls 64 and 65 each having a small lateral length and two long side walls (not illustrated) each having a large lateral length. The long side walls face the respective end faces, in the layering direction, of the electrode body 11 with the insulating holder 30, which will be described later, interposed therebetween. On the other hand, the short side walls 64 and 65 face the respective side end faces 15 and 16 orthogonal to the end faces, in the layering direction, of the electrode body 11, with the insulating holder 30 interposed therebetween. In addition, curved surfaces 66 and 67 are formed at respective corner portions P1 and P2 connecting the inner surface of the bottom plate portion 62 of the outer case 60 to the inner surfaces of the respective two short side walls 64 and 65. Note that, in the outer case 60, the relationship between the lateral lengths of two adjacent side walls orthogonal to one another in the present embodiment may be reversed. The curved surfaces 66 and 67 each have, for example, an arc-shaped section, and the R dimension of each of the curved surfaces 66 and 67 can be within a range of, for example, 0.5 mm or more to 3 mm or less, and preferably within a range of 1 mm or more to 2 mm or less. Regarding the R dimension at each corner portion extending in a direction parallel to each side wall and the bottom plate portion, the R dimensions at all points in the same direction are not necessarily equal to one another.

As FIGS. 2 and 3 illustrate, the insulating holder 30 is an accommodating body that is formed by shaping an insulating sheet 31 into a box shape and that accommodates the electrode body 11.

Figure 4:
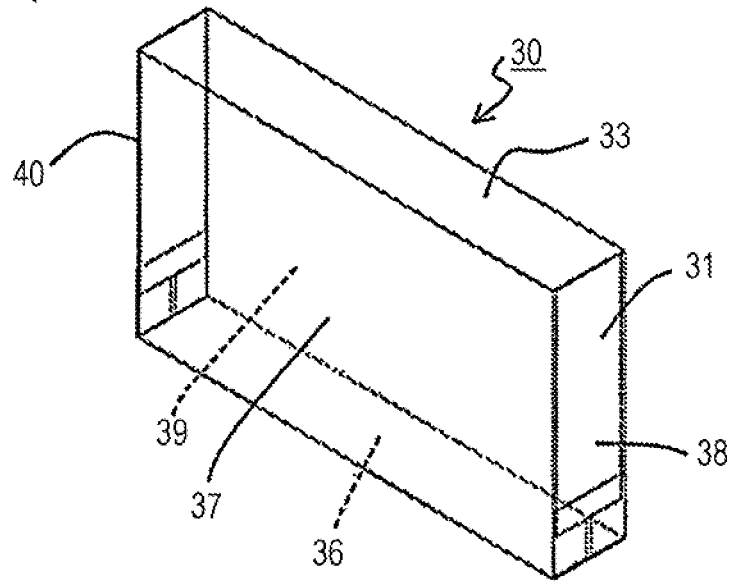
FIG. 4 is a perspective view illustrating an assembled state of the insulating holder according to the example of the embodiment.

FIG. 4 is a perspective view illustrating an assembled state of the insulating holder 30. As FIG. 4 illustrates, the insulating holder 30, which is formed by assembling the insulating sheet 31 into a box shape, has a bottom face portion 36 and four side face portions 37 to 40 arranged vertically on the bottom face portion 36. In the insulating holder 30, an end facing away from the bottom face portion 36 has a holder opening 33 surrounded by the end portions of the side face portions 37 to 40. The insulating holder 30 may have a prismatic case shape so as to match the inner space of the outer case 60.

Figure 5:
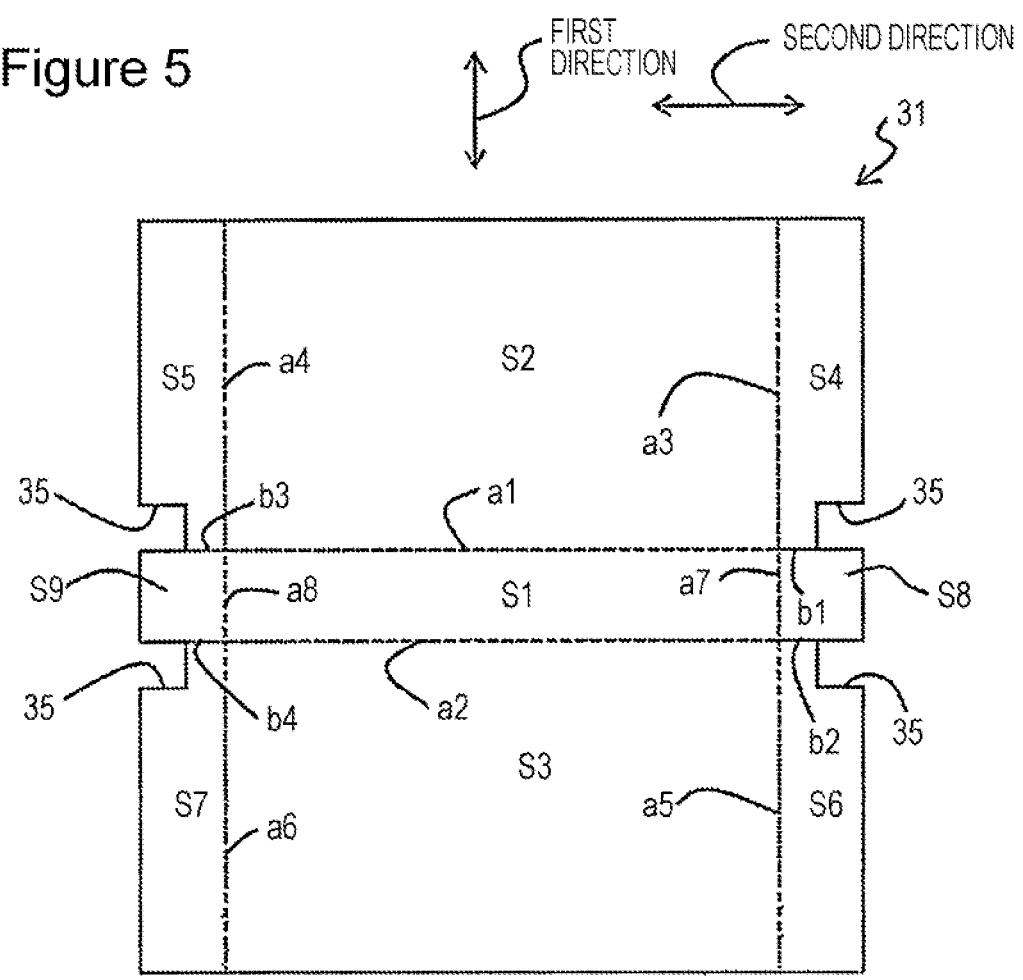
FIG. 5 is a developed view of the insulating sheet before the insulating holder illustrated in FIG. 4 is assembled.

FIG. 5 is a developed view of the insulating sheet 31 before the insulating holder 30 is assembled. The insulating sheet 31 is substantially rectangular as a whole and is constituted by plural sheet elements split by plural folds (broken lines a1 to a8) and plural slits (solid lines b1 to b4). Specifically, the insulating sheet 31 is constituted by first to ninth sheet elements S1 to S9. Note that each of the fourth to seventh sheet elements S4 to S7 has a cutout 35 formed by cutting out a rectangular portion adjacent to a corresponding one of the eighth sheet element SB and the ninth sheet element S9.

When the insulating holder 30 is formed, the first to ninth sheet elements S1 to S9 are bent at the folds a1 to a8 provided on the mutual boundaries. Thus, the bottom face portion 36 of the insulating holder 30 is formed by the first sheet element S1, and the four side face portions 37 to 40 of the insulating holder 30 are formed by the second to ninth sheet elements S2 to S9. The folds a1 to a8 form sides connecting the adjacent faces of the insulating holder 30.

Note that the form of the insulating sheet 31 illustrated in FIG. 5 is an example, the insulating sheet 31 is not limited to the example, and any form may be possible as long as, at least, a box-shaped insulating holder 30 can be formed by sheet elements split by folds.

The insulating sheet 31 has, for example, a single-layer structure constituted by a porous body or a multilayer structure including a porous body. The multilayer structure including a porous body is, for example, a multilayer structure in which plural porous bodies are layered or a multilayer structure in which a porous body and a non-porous body are layered. The porous body is a structure having numerous pores (bubbles) inside. In contrast, the non-porous body is a structure substantially not including any pores (bubbles). However, a non-porous body including a few pores (bubbles) accidentally locked therein, for example, in a manufacturing process comes within the category of the non-porous body.

Compared with the insulating sheet constituted by the non-porous body, the insulating sheet including the porous body is lightweight by an amount corresponding to the included pores when the insulating sheets have the same thickness, and the weight of the prismatic power storage device can thereby be reduced. In addition, in an instance of the insulating sheet constituted by the non-porous body, it is necessary to provide a sufficient space between the insulating sheet and the electrode body or between the insulating sheet and the outer case to ensure the space for the electrode body that expands during charging of the prismatic power storage device. In contrast, compared with an instance of the insulating sheet constituted by the non-porous body, the insulating sheet including the porous body ensures the space for the electrode body that expands, even if a space provided between the insulating sheet and the electrode body or between the insulating sheet and the outer case is narrowed (or even if no space is provided), because the pores of the porous body are crushed, and the insulating sheet is compressed (the thickness of the sheet is reduced) when the electrode body expands. Thus, with the insulating sheet including the porous body, the rigidity of the sheet can be ensured because it is possible to make the sheet thicker than the insulating sheet constituted by the non-porous body for the purpose of weight reduction of the prismatic power storage device and ensuring a space for the electrode body that expands during charging. Consequently, the formability to the box-shaped insulating holder increases. Accordingly, it is suppressed that, when, for example, the insulating holder is placed in the outer case with the electrode body, the battery performance is decreased by pressure beyond assumptions being applied to the electrode body due to the insulating holder wrinkling, or insulation between the electrode body and the outer case cannot be ensured due to the insulating sheet curling.

The porosity of the porous body is preferably within a range of 5% to 50%, and more preferably within a range of 10% to 30% in view of ensuring the rigidity of the insulating sheet 31. Note that the porosity of the non-porous body is 1% or less. Here, examples of a porosity measurement method include a method in which a section of the porous body is observed by using a scanning electron microscope (SEM), and an obtained image is analyzed to determine a porosity. Specifically, the section of the porous body is magnified at 5,000-fold magnification by using the scanning electron microscope (SEM) and recorded as a digital image. Next, the image is captured in an image processing software called ImageJ, and 8-bit is selected from Type in an Image menu. Next, Threshold is selected from Adjust in the Image menu in a similar manner, threshold values are adjusted to extract a region of voids in the section of the porous body, and the region of the voids and a region other than the voids are binary-converted to be distinguished from one another. Lastly, Analyze Particles is selected from an Analyze menu, the area of the voids is determined by calculation, and the porosity is obtained by an equation below. Note that the porosity here means the average value of porosities obtained from randomly chosen ten sectional images.

$$\text{porosity (\%)} = (\text{area of voids})/(\text{area of entire resin layer}) \times 100$$

Examples of the porous body constituting the insulating sheet 31 include a synthetic paper mainly containing resin and a foamable resin sheet. The synthetic paper is paper produced by using resin as a main component and has an opaque outer appearance and a feel that strongly resemble a wood pulp paper but has physical properties equivalent to those of paper and a synthetic resin film.

Examples of a synthetic resin as a main component of the synthetic paper include polyolefins, polyesters, and polyamides. Examples of the polyolefins include polyethylene, polypropylene, ethylene-propylene copolymers, ethylene-vinyl acetate copolymers, ethylene-propylene-butene-1 copolymers, poly(4-methylpentene-1), and polystyrene. Examples of the polyesters include polyethylene terephthalate and polybutylene terephthalate. Examples of the polyamides include nylon 6 and nylon 66. The main component here means a component contained in an amount of not less than 50% by mass of all the components of the synthetic paper.

The pores of the synthetic paper are formed, for example, in a stretching process. For example, by stretching a synthetic resin containing a filler, minute pores are formed around the filler. Examples of the filler include inorganic fillers such as calcium carbonate, calcined clay, diatomaceous earth, talc, titanium oxide, barium sulfate, aluminum sulfate, and silica. For example, YUPO (registered trademark) (Yupo Corporation), Crisper (registered trademark) (TOYOBO CO., LTD.), and N-Coat (registered trademark) (Nakamoto Packs Co., Ltd.) can be included in specific examples of the synthetic paper including pores.

The foamable resin sheet is a sheet produced in a manner such that, for example, a mixture of a material such as a synthetic resin or rubber to which a foaming agent such as sodium hydrogencarbonate is added is treated with heat and shaped into a sheet shape by using a device such as an extruder. Because the foaming agent is gasified by such a heat treatment being performed, the gasified foaming agent turns into pores (bubbles) and remains in the resin.

Examples of the synthetic resin to be a raw material of the foamable resin sheet include polyolefin, polyester, polyamide, polyacetal, polycarbonate, polyimide, polyether ketone, polyether sulfone, polyphenylene oxide, polyphenylene sulfide, polyethylene naphthalene, polytetrafluoroethylene, polyvinylidene fluoride, and polyethylene terephthalate. In addition, examples of the synthetic rubber to be a raw material of the foamable resin include styrene-butadiene rubber, polychloroprene rubber, nitrile rubber, butyl rubber, butadiene rubber, isoprene rubber, ethylene propylene rubber.

Figure 6:
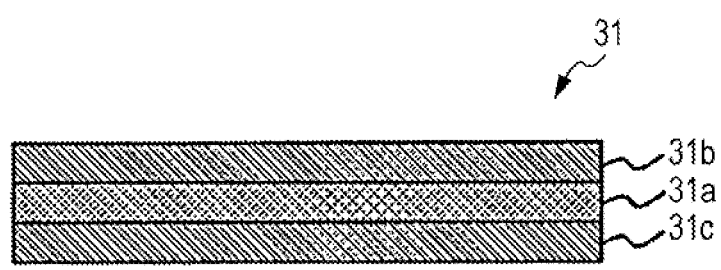
FIG. 6 is a schematic sectional view of an example of the insulating sheet having a multilayer structure including a porous body.

FIG. 6 is a schematic sectional view of an example of the insulating sheet 31 having a multilayer structure including the porous body. The insulating sheet 31 illustrated in FIG. 6 has a three-layer structure including an intermediate layer 31a, a first surface layer 31b disposed on one side of the intermediate layer 31a, and a second surface layer 31c disposed on the other side of the intermediate layer 31a. Although the insulating sheet 31 illustrated in FIG. 6 has a three-layer structure, the insulating sheet having a multilayer structure according to the present embodiment may have a two-layer structure or a four or more-layer structure.

Regarding the insulating sheet 31 illustrated in FIG. 6, at least one of the intermediate layer 31a, the first surface layer 31b, and the second surface layer 31c may be the porous body. However, in view of, for example, insulation between the electrode body and the outer case, at least one of the first surface layer 31b and the second surface layer 31c is preferably the non-porous body.

In addition, in the insulating sheet according to the present embodiment, the porosity of a surface layer is preferably lower than that of an inner portion. Regarding the insulating sheet 31 illustrated in FIG. 6, the intermediate layer 31a is preferably the porous body, and each of the first surface layer 31b and the second surface layer 31c is preferably the non-porous body. With the configuration, it is possible to increase the porosity while ease of assembling is ensured in a more efficient manner.

The thickness of the insulating sheet 31 is preferably within a range of, for example, 100 μm to 300 μm and more preferably within a range of 100 μm to 150 μm for ensuring rigidity.

Note that an example in which the prismatic power storage device according to the above-described embodiment is applied to a non-aqueous electrolyte secondary battery such as a lithium ion secondary battery is described above. However, the prismatic power storage device according to the embodiment is not limited to such a non-aqueous electrolyte secondary battery and may also be applied to an aqueous secondary battery such as a nickel metal hydride secondary battery or a capacitor such as an electric double layer capacitor. In addition, although an example in which the electrode body of the power storage device is a layered type is described in the above-described embodiment, the electrode body of the power storage device is not limited to such a type. For example, the electrode body may be configured in a manner such that a long positive electrode plate and a long negative electrode plate are layered with a long separator interposed therebetween and, in such a state, wound into a tubular shape, and the obtained wound electrode body is pressed and flattened from the lateral sides so as to have a flat shape. Even when the electrode body is such a wound type, the configuration according to the present disclosure is applicable thereto.

REFERENCE SIGNS LIST

10 prismatic power storage device
11 electrode body
12 positive electrode lead
13 negative electrode lead
15, 16 side end face
30 insulating holder
31 insulating sheet
31a intermediate layer
31b first surface layer
31c second surface layer
33 holder opening
35 cutout
36 bottom face portion
37 to 40 side face portion
60 outer case
61 opening
62 bottom plate portion
64, 65 short side wall
66, 67 curved surface
80 sealing plate
81 positive terminal
82 negative terminal
83, 84 current collecting member
85 pressure regulating valve

The invention claimed is:

1. A prismatic power storage device comprising:
an electrode body including a positive electrode plate, a negative electrode plate, and a separator disposed between the positive electrode plate and the negative electrode plate;
an insulating holder formed by shaping an insulating sheet into a box shape and accommodating the electrode body;
a prismatic outer case having an opening and accommodating the electrode body and the insulating holder; and
a sealing body sealing the opening of the outer case, wherein
the insulating sheet includes a porous body, wherein
the insulating sheet has a multilayer structure including the porous body, and wherein
at least one of surface layers of the insulating sheet having the multilayer structure is a non-porous body.

2. The prismatic power storage device according to claim 1, wherein
the porous body is a synthetic paper mainly containing resin.

3. The prismatic power storage device according to claim 1, wherein
the porous body is a sheet containing a foamable resin.

4. A prismatic power storage device comprising:
an electrode body including a positive electrode plate, a negative electrode plate, and a separator disposed between the positive electrode plate and the negative electrode plate;
an insulating holder formed by shaping an insulating sheet into a box shape and accommodating the electrode body;
a prismatic outer case having an opening and accommodating the electrode body and the insulating holder; and
a sealing body sealing the opening of the outer case, wherein
the insulating sheet includes a porous body, wherein
the insulating sheet has a multilayer structure including the porous body, and wherein,
in the insulating sheet having the multilayer structure, a porosity of a surface layer is lower than a porosity of an inner portion.

5. The prismatic power storage device according to claim 1, wherein
the porous body has a porosity within a range of 5% to 50%.

6. The prismatic power storage device according to claim 1, wherein
the insulating sheet has a thickness within a range of 100 µm to 300 µm.

7. The prismatic power storage device according to claim 4, wherein
the porous body is a synthetic paper mainly containing resin.

8. The prismatic power storage device according to claim 4, wherein
the porous body is a sheet containing a foamable resin.

9. The prismatic power storage device according to claim 6, wherein
the porous body has a porosity within a range of 5% to 50%.

10. The prismatic power storage device according to claim 6, wherein the insulating sheet has a thickness within a range of 100 µm to 300 µm.

* * * * *